(12) United States Patent
Malone et al.

(10) Patent No.: US 6,295,759 B1
(45) Date of Patent: Oct. 2, 2001

(54) PROCESS FOR HYDROPONIC CULTIVATION OF PLANTS

(75) Inventors: Joseph W. G. Malone, Liverpool; Sandra J. Davies, Widnes; Robert A. Simms, Warrington, all of (GB)

(73) Assignee: Solvay (Societe Anonyme) (BE)

( * ) Notice: Subject to any disclaimer, the term of this patent is extended or adjusted under 35 U.S.C. 154(b) by 0 days.

(21) Appl. No.: 09/379,785

(22) Filed: Aug. 24, 1999

(Under 37 CFR 1.47)

(30) Foreign Application Priority Data

Aug. 26, 1998 (EP) .................................................. 98306856

(51) Int. Cl.⁷ .................................................. A01G 31/00
(52) U.S. Cl. ........................... 47/62 R; 47/62 E; 47/62 N
(58) Field of Search ........................... 47/59, 62 R, 62 A, 47/62 C, 62 E, 62 N

(56) References Cited

U.S. PATENT DOCUMENTS

| | | | | |
|---|---|---|---|---|
| 3,578,431 | * | 5/1971 | Ingestad et al. | 47/62 |
| 4,118,891 | * | 10/1978 | Kehl et al. | 47/59 |
| 4,245,433 | | 1/1981 | Sjostedt et al. . | |
| 4,332,105 | * | 6/1982 | Nir | 47/62 |
| 5,009,029 | * | 4/1991 | Wittlin | 47/62 |
| 5,168,655 | * | 12/1992 | Davidson et al. | 47/62 |
| 5,184,420 | * | 2/1993 | Papadopoulos et al. | 47/62 |
| 5,597,731 | * | 1/1997 | Young et al. | 47/62 |

FOREIGN PATENT DOCUMENTS

| | | | | |
|---|---|---|---|---|
| 142989 | * | 5/1985 | (EP) | 47/62 |
| 0 361 955 | | 4/1990 | (EP) . | |
| 0 406 458 | | 1/1991 | (EP) . | |
| 605063 | * | 7/1994 | (EP) | 47/42 |
| 2 677 848 | | 12/1992 | (FR) . | |
| 2 224 441 | | 5/1990 | (GB) . | |
| 404325035 | * | 11/1992 | (JP) | 47/62 |
| 9201631 | | 4/1994 | (NL) . | |
| 1625448 | * | 2/1991 | (SU) | 47/62 |
| 1746950 | * | 7/1992 | (SU) | 47/62 |

OTHER PUBLICATIONS

Derwent Abstract of Danish Patent Appln. No. 9 300 538; "Disinfection and Biological Combat of Plant . . . ".
Derwent Abstract of French Appln. No. 2677848; "Adjustable Irrigation System for Forcing Chicory—. . . ".
Derwent Abstract of Danish Patent Appln. No. NL 9201631; "Disinfecting Drainag Water, ESP from Horticultual Establishment, . . . ".
Derwent Abstract of Japanese Appln. No. 04 126020; "Sterile Culture Liquid Hydroponic Hydroponic Apparatus . . . ".

* cited by examiner

Primary Examiner—Peter M. Poon
Assistant Examiner—Son T. Nguyen
(74) Attorney, Agent, or Firm—Larson & Taylor, PLC

(57) ABSTRACT

In a process for hydroponic cultivation of plants an irrigation solution containing water and at least one nutrient is circulated through a main loop at a first point where a disinfectant is added to the irrigation solution. At a second point at least one nutrient is added to the irrigation solution. At a third point the plants are supplied with the irrigation solution, and at a fourth point the irrigation solution drained of the plants is collected. The main loop is provided with one or more sub-loops through which the irrigation solution is recirculated.

12 Claims, 2 Drawing Sheets

PROCESS FOR HYDROPONIC CULTIVATION OF PLANTS

FIELD OF THE INVENTION

This invention concerns a process for hydroponic cultivation of plants using a particular system for the irrigation of plants. More specifically it concerns the provision of a system of plant irrigation which enables controlling unwanted microbial growth within this system.

BACKGROUND OF THE INVENTION

In order both to speed up the growth process of plants and to provide a year round supply for the consumer, many vegetables are grown either completely or partially isolated from the outside environment, for example in greenhouses. The conditions under which the plants are grown can thereby be closely regulated and parameters such as temperature, water, nutrient make-up, light etc. carefully controlled. The water and nutrient level can especially be controlled where a substrate other than soil is used for the plants to grow in, for example rockwool, perlite, silica gel, and plastic foams. These do not actually supply the plant with minerals but serve simply as a substrate for the root system. In such so-called hydroponic systems, the nutrients such as potassium, sodium, molybdenum, phosphate, nitrate, etc. are usually applied dissolved in the water. Although this can be carefully controlled, some excess water supply will inevitably occur. The excess can then either be discharged to the environment or recycled, possibly with further treatment before re-use. The former option is now less favoured for the following reasons. First, plant nutrients dissolved in the water can cause eutrophication. Secondly, the water may in addition contain pesticides which could also have a negative impact on the environment if discharged in large quantities. Thirdly, it is becoming increasingly undesirable to discharge water to drain, not just on cost grounds but also to conserve a restricted supply. Re-use of the excess water does however bring with it its own problems, especially where the water is utilised for the same plants. The chief reason for this is that plant pathogens can be carried through in the water and the irrigation system then often provides suitable breeding conditions for the plant pathogen, which makes re-use of this water highly unsuitable. It is often desirable therefore for a suitable disinfectant to be added at some point in the water recycle to remove or reduce the pathogen population. Well known disinfectants in this area include hypochlorite, ozone and UV irradiation as well as biological control mechanisms. A further group of compounds suitable for disinfecting the substrate and the water supplied to the plant is disclosed in British Patent Application 2,224,441, where organic percarboxylic acids, particularly peracetic acid are used.

Simply killing any plant pathogens in the water via disinfection does however have an unwanted side-effect due to the biological equilibrium of the water being thus disturbed. According to the Derwent® abstract of Danish Patent Application DK 9300538 the population of one particular group of fungal species Trichoderma spp. is normally kept down due to competition from other micro-organisms present in the water. When these competitors are removed however, for example by disinfection, then the population of the Trichoderma can increase. It can eventually form a fibrous mat which can block up pipework and nozzles used to irrigate the plants. Removal of this material is a time consuming process, involving temporary dismantling of the pipework of the irrigation system, which would, and especially in warmer weather, need to be carried out frequently.

In the above-mentioned disinfectants which can, potentially, be used, the following disadvantages may be mentioned. Hypochlorite suffers from two main problems. First, the solutions containing the hypochlorite will also comprise a large quantity of sodium chloride which may not be suitable for the particular plant grown. Secondly, hypochlorite is increasingly coming under pressure from environmental considerations due to their capacity to form unwanted chlorinated organic compounds via side reactions. For ozone and UV treatment, expenditure and equipment can be expensive.

Biological control is also difficult to achieve as care must be taken, first to select a control which can adequately maintain the targeted micro-organism(s) at an acceptable level, and secondly to select a control which will not cause problems itself—for example by reaching an unacceptable population size.

The above problem with Trichoderma can be exacerbated when percarboxylic acids are used. Percarboxylic acids are usually supplied as an equilibrium solution containing the parent carboxylic acid, and furthermore once the percarboxylic acid has carried out its disinfection then the carboxylic acid remains as a by-product. As some carboxylic acids can be readily used as a food source by Trichoderma the result is that although its population may initially drop, the end result of application of the percarboxylic acid can be an increase in Trichoderma's population.

Potential problems with percarboxylic acids have been further exemplified in the prior art when they have been applied to such recycle systems, for example in the Derwent® abstract of the Dutch Patent Application 9201631. In this patent percarboxylic acids were used to control bacteria and other micro-organisms. A further treatment was however also required using ultra-violet radiation to kill off viruses and moulds, along with occasional treatment of the water with acidified percarboxylic acids to remove various deposits which built up during prolonged use of the irrigation system.

Conventional recycle systems are particularly prone to fouling by unwanted microbial species. Especially during periods of low water uptake by the plants, large volumes of water remain stagnant, and hence provide an excellent breeding ground for species such as Trichoderma. Although much research, as outlined above) has been carried out into methods of disinfection of the irrigation water, the aforementioned problems have not been solved.

It is therefore an object of the present invention to solve these problems by providing a process for hydroponic cultivation of plants which makes it possible to control plant pathogens whilst at the same time inhibit the selective growth of other non pathogenic microbial species such as Trichoderma spp.

SUMMARY OF THE INVENTION

According to the current invention, there is provided a process for hydroponic cultivation of plants wherein an irrigation solution containing water and at least one nutrient is circulated through a main loop at a first point of which a disinfectant is added to the irrigation solution, at a second point of which at least one nutrient is added to the irrigation solution, at a third point of which the plants are supplied with the irrigation solution, at a fourth point of which the irrigation solution drained of the plants is collected and recirculated to the first point, the main loop being provided with one or more sub-loops through which the irrigation solution is recirculated.

One of the essential characteristics of the invention is the combination of a suitable configuration of the irrigation system in conjunction with a percarboxylic acid. This combination can indeed not only bring about the desired removal of the plant pathogens but also control other non pathogenic microbial species such as fungi, for example Trichoderma.

The process of the invention uses a circulation system provided with one or more sub-loops. The starting point of the sub-loop is advantageously situated between the second point at which at least one nutrient is added to the irrigation solution and the third point at which the plants are supplied with the irrigation solution. It can also be advantageous that the sub-loop, which starts at any point of the main loop, joins the main loop again at the second point where at least one nutrient is added to the irrigation solution. His particularly preferred that the sub-loop leaves the main loop at a point situated between the second and the third points, and joins the main loop again at the second point. According to a first alternative the sub-loop comprises a circulation pump which pumps the irrigation solution from the starting point back to the second point. According to a second alternative the sub-loop comprises a pipework which feeds the irrigation solution from the starting point to a feed machine wherein the concentration of nutrients in the irrigation solution is controlled and optionally adapted, the irrigation solution leaving the feed machine being circulated back to the second point. According to a third alternative the sub-loop comprises an irrigation solenoid which diverts the irrigation solution at a point situated between the second and the third points back to the second point. Two or three of these alternatives can be combined.

It is to be understood that the main loop of the process of the invention can contain other elements than the four points mentioned before. These other elements can be tanks, collectors, pumps, filters, etc. For instance, the main loop can be provided with a means of flushing it with rinse water.

At the first point of the main loop a disinfectant is added to the irrigation solution. The addition of disinfectant may be operated for whole of daily irrigation period. Alternatively, the disinfectant can be added for part of daily irrigation period interspersed with periods of circulation of irrigation liquid without disinfectant. Such a period without disinfectant may be of particular benefit within the last hours as final irrigation to remove any residual carboxylic acids in the irrigation system thereby reducing the possibility of excess growth of Trichoderma or other organisms.

The addition of disinfectant may be carried out directly into the irrigation solution circulating through the main loop. It may be advantageous to add the disinfectant in one or more treatment tanks wherein the irrigation solution is allowed to stand while being treated with the disinfectant to improve reduction of the population of pathogenic or problematic organisms. It can be advantageous to use several treatment tanks, for instance 2, to reduce stagnation time and build up of carboxylic acids which may encourage growth of problematic organisms such as Trichoderma.

Although the system is designed to utilise a wide range of known disinfectants, it is especially suitable for use in conjunction with percarboxylic acids. The percarboxylic acid can be any percarboxylic acid of sufficient. solubility. Examples of such percarboxylic acids include low molecular weight aliphatic peroxyacids, containing up to 6 carbon atoms. Examples include performic acid, peracetic acid, perpropionic acid, perbutyric acid, dipersuccinic acid, diperglutaric acid, and diperadipic acid. The alkyl part of the chain may be optionally substituted with one or more substituents selected from halo-, nitro-, amido-, hydroxy-, carboxy-, sulpho-, or phosphono- groups. Contemplated from this group are monochloroperacetic acid, dichloroperacetic acid, trichloroperacetic acid, and trifluoroperacetic acid. Further examples include the monopercarboxylic acids of dibasic carboxylic acids such as monopersuccinic acid, monoperglutaric acid, monoperadipic acid, and also percitric acid and pertartaric acid. Additionally the substituent may be further derivatised to give groups such as esters or ethers. Examples of these are monoester percarboxylic acids of formula:

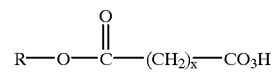

where R represents an alkyl group having from 1 to 4 carbons and x is from 1 to 4.

A mixture of percarboxylic acids, particularly a mixture of mono- and di-, persuccinic, perglutaric and peradipic acids, may be employed if desired. Especially suitable are the monoester percarboxylic acids given above, and more especially, mixtures of these comprising x=2, 3, and 4. The compositions may alternatively or additionally include aromatic and substituted aromatic peroxyacids, such as monoperphthalic acid or salts thereof, sulphoperbenzoic acid or salts thereof chloroperbenzoic acids, and tolueneperbenzoic acids. Especially preferred are peracetic acid and perpropionic acid. Particularly preferred is peracetic acid. Performic acid is also convenient.

The percarboxylic acid can also be added at other points than the first point in the main loop of the circulation system, care being taken however that the concentration of percarboxylic acid which reaches the plant is preferably below a maximum value. This maximum value depends on a variety of factors such as the percarboxylic acid employed, the crop being cultivated and treated, and the age of the crop when treated. In most cases, the concentration of percarboxylic acid in the irrigation solution which reaches the plants should be at most 200 mg/l. For younger plants or seedlings, the maximum value is 150 mg/l because higher values may have deleterious effects. Concentrations of at most 140 mg/l, especially at most 120 mg/l, are convenient.

The percarboxylic acid is generally added in an amount sufficient to reduce the population of the pathogen to the desired level. It is preferred that the percarboxylic acid is added in sufficient quantities to give a concentration in the irrigation solution which reaches the plants of at least 20 mg/l, especially at least 80 mg/l.

The concentration of the percarboxylic acid in the solution added, can contain up to 40% w/w percarboxylic acid. Preferably it will contain from between about 1% w/w to about 15% w/w percarboxylic acid, and particularly preferably from about 5% w/w to about 12% w/w. It is especially preferred to use a solution containing about 12% w/w percarboxylic acid. Although it may be supplied as either an equilibrium solution or a non-equilibrium solution, it is more usual on logistical and stability grounds for it to be supplied as an equilibrium solution. Such equilibrium solutions will contain, in addition to the percarboxylic acid, also acetic acid and hydrogen peroxide. The acetic acid can be present in an amount up to about 40% w/w, but is usually present up to about 20% w/w. The hydrogen peroxide will be present in an amount up to about 30% w/w, but is preferably present in an amount up to 20% w/w. In addition the solutions may contain compounds commonly recognised in the art as percarboxylic acid or hydrogen peroxide stabilisers, such as for example dipicolinic acid, alkylphosphonic acids, and alkali metal stannates. They may also contain corrosion inhibitors such as for example phosphates and polyphosphates, or acids such as sulphuric acid or nitric acid.

At the second point of the main loop at least one nutrient is added to the irrigation solution. Any classical nutrient for hydroponic cultures can be used.

At the third point of the main loop the plants are irrigated with the irrigation solution. This can be done in various ways. For instance, the irrigation solution can be sprayed on the plants. Alternatively, the irrigation solution can be added to the substrate in which the plants grow. Both alternatives can be combined.

At the fourth point of the main loop, part of the irrigation solution which has not been taken up by the plants is drained of the plants and collected in order to be recirculated to the first point.

The process of the invention can be employed to control the growth of a wide range of microbial species. Common examples of these are tomato pathogens such as Phytophthora cryptogea, Pythium aphanidermatum, Thielaviopsis basicola and Colletotrichum coccodes, as well as other fungal pathogens such as Fusarium oxysporum, and Penicillium cyclopium.

The process of the invention may particularly find use in the cultivation of a wide range of crops such as tomato, strawberry, cucumber and other soft fruits.

DETAILED DESCRIPTION OF THE PREFERRED EMBODIMENTS

Figure 1:
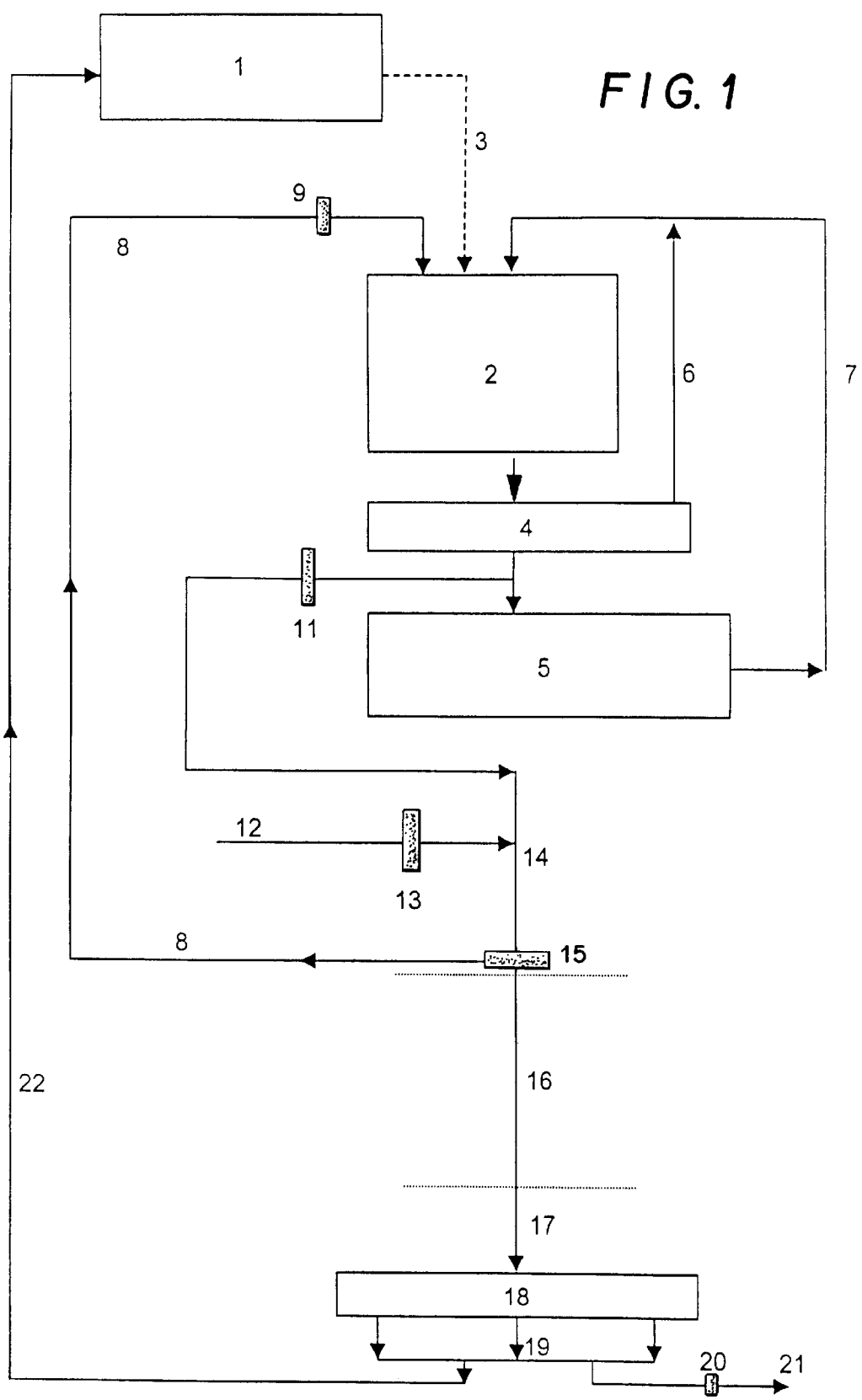
FIG. 1 is a flow diagram showing the various stages in the process of the invention.
Figure 2:
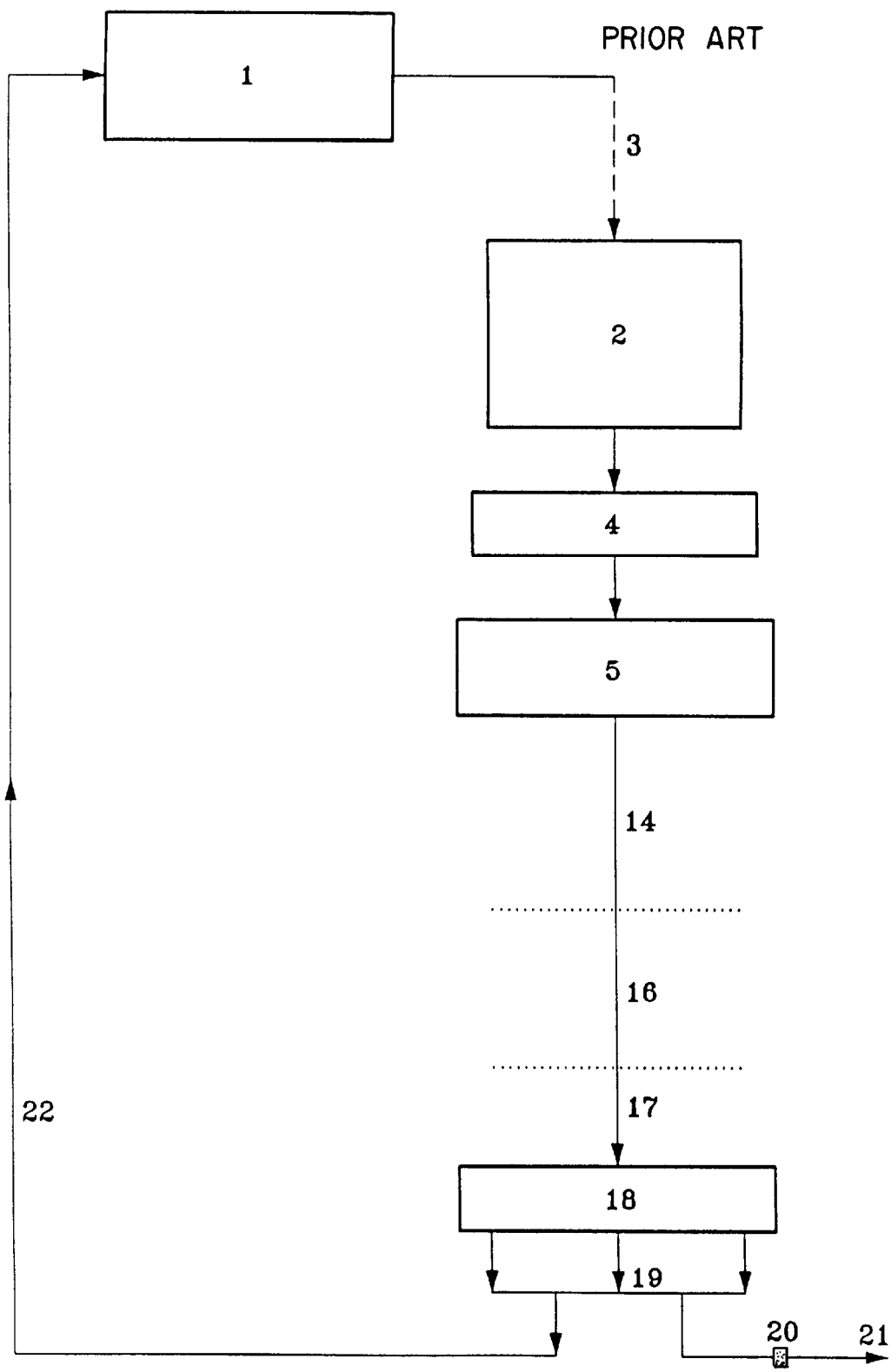
FIG. 2 is a flow diagram having a prior art semi-closed irrigation system.

FIG. 1 illustrates one aspect of the process of the present invention. Irrigation solution drained of the plants is collected, via pipework, 22, in the collection tank 1. The irrigation solution is then disinfected before being passed, via pipework 3, to a feed tan, 2, in which nutrients and fresh make-up water can be added to the irrigation solution. It may be advantageous if 3 comprises retention tanks in which disinfection can take place. A circulation pump, 4, then pumps the irrigation solution further in one or more of three alternative directions. The first alternative is that the irrigation solution is passed via a non-return valve, 11, to a main feed delivery line, 14 which sends the irrigation water in the direction of the plants. The second alternative, which constitutes a sub-loop in accordance with the invention, is that the irrigation solution is circulated via pipework, 6, back to the feed tank 2. The third alternative, which also constitutes a sub-loop in accordance with the present invention, is that the irrigation solution is fed into a feed machine (i.e. nutrient supply), 5. The feed machine 5 is equipped with sensors which determine the concentration in the irrigation solution of the nutrients necessary for the plants. If the concentrations are outside a predetermined level then the feed machine can adjust them accordingly. The irrigation solution then leaves the feed machine 5 and re-enters the feed tank 2 via pipework, 7. A further sub-loop is provided in the form of irrigation solenoid, 15, and pipework (return line), 8. In the event of low irrigation solution up-take by the plants, solenoid 15 allows irrigation solution to be diverted, via pipework 8 back to the feed tank 2. The force required for circulation can be provided by motorised valve, 9. When irrigation solution is required by the plants it is allowed through irrigation solenoid, 15, and then proceeds via sub-feed lines, 16, to the nozzles, 17, which supply the individual plants 18. Any excess irrigation solution 19 is either recycled back to tank 1 via pipework 22, or discharged to drain, 21, upon opening outflow valve, 20. The system can further be provided with a means of flushing the pipework with rinse water should this become necessary, namely that rinse water, 12, is allowed to enter the system upon opening rinse valve, 13.

Having described the invention in general terms, specific embodiments thereof are described in greater detail by way of example only.

EXAMPLE 1
(In Accordance with the Invention)

A semi-closed irrigation system as described in FIG. 1 was employed to provide water to a tomato crop housed in a greenhouse. The tomatoes were grown on an inert rockwool substrate. Peracetic acid was added to area 3 of FIG. 1 in amounts to maintain its level at around 100 mg/l peracetic acid. The peracetic acid employed contained approximately 12% w/w peracetic acid, 20% w/w hydrogen peroxide, and 16% w/w acetic acid. The dosage was controlled to within a peractetic acid range of 80–120 mg/l. This was allowed to stand for a minimum period of 60 minutes. Two small treatment tanks were employed to alternate the sequencing of treatment and discharge over a cycle time of approximately 1 hour. When a proportion of the treated solution was discharged to the nutrient feed tank, dilution occurred due to the increase in liquor volume and the addition of fresh make-up water. Water was circulated by means of a circulation pump 4, and nutrients provided by a feed machines. At the end of the day, a shut-down sequence, initiated by a timer, terminated the peracetic acid dosing operations 3–4 hours before the cessation of the normal irrigation process. Automated flushing sequences were incorporated to remove residual peroxygens from the treatment tanks (3) themselves and also to reduce the overall peroxygen residuals in the nutrient feed tank (2) and also via rinse valve (13) to feed lines (13, 15, 16 and 17) onto the plants (18). In addition the start-up sequence commenced approximately one hour before the first feed. Both treatment tanks were filled and dosed with peracetic acid to allow sufficient standing time for effective disinfection to occur. All materials for system and equipment were chosen for safety and compatibility with peracetic acid.

The system was employed for a period of approximately 2 months in a standard commercial greenhouse and was evaluated alongside control systems for comparison. Replicated plots of tomato plants were used for treatment comparisons: (i) inoculated plants treated with peracetic acid introduced and circulated employing the system described, (ii) uninoculated control and (iii) inoculated control. Pathogenic fungi were introduced onto the tomato crops for treatments (ii) and (iii). Pathogen spread was monitored by seedling bioassay (introduction of seedlings at various points in the rows) leaving for 1–2 days the removed micro-organisms for microscopic inspection to observe root and foliar condition to determine pathogen spread and establishment in the crop and effects on plant growth, eg. leaf size, plant height, root size and colouration and including phytotoxic effects, and tomato yields were also monitored. The trial showed that the introduced pathogens (*Phytophtora cryptogea, Thieleviopsis basicola, Colletotrichum coccodes,* and *Pythium aphanidermatum*) were controlled, widespread dissemination of the pathogens was prevented and there was no significant build up of Trichoderma in the tanks, pipework or nozzles. In addition, this system of peracetic acid treatment did not show any phytotoxic effects, and yield improvements were noted.

EXAMPLE 2

(Given by Way of Comparison)

A semi-closed irrigation system as described in FIG. 2, not according to the current invention, was employed to provide water to a tomato crop housed in a greenhouse. The numbering used in FIG. 2 corresponds to that used in FIG. 1 The tomatoes were grown on an inert rockwool substrate. Peracetic acid was added to area 3 of FIG. 2 in amounts to maintain its level at around 100 mg/l peracetic acid. The peracetic acid employed contained approximately 12% w/w peracetic acid, 20% w/w hydrogen peroxide, and 16% w/w acetic acid. The dosage wag controlled to within a peracetic acid range of 80–120 mg/l. Water was circulated by means of a circulation pump 4, and nutrients provided by a feed machine, 5. This system was evaluated in the same way and with the same treatments as outlined in example 1. Although the use of this system reduced the population of plant pathogens (same speces as example 1 were applied), was found to be not sufficient to suppress the growth of Trichoderma, with the result that after approximately 6–8 weeks the pipework and nozzles became blocked, and required cleaning.

What is claimed is:

1. A process for hydroponic cultivation of plants wherein an irrigation solution containing water and at least one nutrient is circulated through a main loop at a first point of which a disinfectant is added to the irrigation solution, at a second point of which at least one nutrient is added to the irrigation solution, at a third point of which the plants are supplied with the irrigation solution, at a fourth point of which the irrigation solution drained of the plants is collected and recirculated to the first point, the main loop being provided with at least one sub-loop through which the irrigation solution is recirculated.

2. The process according to claim 1 wherein the starting point of the sub-loop is situated between the second point and the third point.

3. The process according to claim 2, wherein the sub-loop joins the main loop again at the second point.

4. The process according to claim 3 wherein the sub-loop comprises a circulation pump which pumps the irrigation solution from the starting point of the sub-loop back to the second point.

5. The process according to claim 3 wherein the sub-loop comprises a pipework which feeds the irrigation solution from the starting point of the sub-loop to a feed machine wherein the concentration of nutrients in the irrigation solution is controlled and optionally adapted, the irrigation solution leaving the feed machine being circulated back to the second point.

6. The process according to claim 3 wherein the sub-loop comprises an irrigation solenoid which diverts the irrigation solution at the starting point of the sub-loop back to the second point.

7. The process according to claim 1, wherein the disinfectant comprises percarboxylic acid.

8. The process according to claim 7 wherein the disinfectant comprises peracetic acid.

9. The process according to claim 1, wherein the concentration of disinfectant in the irrigation solution which reaches the plants is from 20 mg/l to 200 mg/l.

10. The process according to claim 1 wherein the main loop includes a means of flushing the main loop with rinse water.

11. The process according to claim 1 applied to substrate or liquid hydroponic cultivation of plants.

12. The process according to claim 1 wherein the disinfectant is added in two treatment tanks wherein the irrigation solution is allowed to stand while being treated with the disinfectant, said treatment tanks being part of said main loop.

* * * * *